(12) United States Patent
Antolin et al.

(10) Patent No.: US 8,442,275 B2
(45) Date of Patent: May 14, 2013

(54) SYSTEM FOR IDENTIFYING SUSTAINABLE GEOGRAPHICAL AREAS BY REMOTE SENSING TECHNIQUES AND METHOD THEREOF

(75) Inventors: Ricardo Arjona Antolin, Seville (ES); Maria De Las Nieves Valenzuela Romero, Seville (ES); Beatriz Alonso Martinez, Madrid (ES); Raquel Diaz Molist, Madrid (ES); Rocio Garcia Encinas, Seville (ES); Maria Angeles Gutierrez Montero, Seville (ES); Jesus Yanez Vidal, Seville (ES); Laura Montes Garcia, Seville (ES); Jesus Lopez Lopez, Seville (ES); Macarena Marquez Pinuela, Seville (ES); Marta Vazquez Garcia, Sarriguren (ES)

(73) Assignee: Abengoa Bioenergia Nueva Technologias, S.A., Seville (ES)

( * ) Notice: Subject to any disclaimer, the term of this patent is extended or adjusted under 35 U.S.C. 154(b) by 196 days.

(21) Appl. No.: 13/165,911

(22) Filed: Jun. 22, 2011

(65) Prior Publication Data

US 2012/0288163 A1     Nov. 15, 2012

(30) Foreign Application Priority Data

May 9, 2011   (EP) .................................. 11382136

(51) Int. Cl.
*G06K 9/00* (2006.01)
*H04N 7/10* (2006.01)

(52) U.S. Cl.
USPC ............................................ 382/113; 725/35

(58) Field of Classification Search .................. 382/109, 382/110, 113; 348/143; 701/56, 409, 461; 702/2, 702/5, 24; 725/35
See application file for complete search history.

(56) References Cited

U.S. PATENT DOCUMENTS

| | | | | |
|---|---|---|---|---|
| 4,984,279 | A | * | 1/1991 | Kidney et al. ................. 382/113 |
| 5,652,717 | A | * | 7/1997 | Miller et al. ...................... 703/6 |
| 2012/0287270 | A1 | | 11/2012 | Arjona Antolin |
| 2012/0290221 | A1 | | 11/2012 | Arjona Antolin |
| 2012/0290344 | A1 | | 11/2012 | Arjona Antolin |
| 2012/0290362 | A1 | | 11/2012 | Arjona Antolin |
| 2012/0290363 | A1 | | 11/2012 | Arjona Antolin |

OTHER PUBLICATIONS

Dai Xiao-Ai et al, "Land Use and Land Cover Change analysis using satellite remote sensing and GIS", Geoscience and Remote Sensing (IITA-GRS), 2010 Second IITA International Conference on, IEEE, Piscataway, NJ, USA, Aug. 28, 2010, pp. 385-388.

(Continued)

*Primary Examiner* — Abolfazl Tabatabai
(74) *Attorney, Agent, or Firm* — Gardner Groff Greenwald & Villanueva, P.C.

(57) ABSTRACT

Particularly applicable to the implementation of sustainability requirements concerning on the promotion of the use of bioproduct from renewable sources, through the system and method described is possible to ensure that the origin of raw materials is sustainable (according to a previously defined sustainability requirements), avoiding travel to the area of interest, thus saving time and economic costs and preventing errors and fraud. More specifically, the system and method object of the invention are particularly applicable for identifying those areas that comply with said sustainability requirements. Said sustainability requirements state that raw material intended for bioproduct shall not be made from lands with a high biodiversity, high carbon stock or peatlands, and bearing in mind additionally the land use requirement.

7 Claims, 1 Drawing Sheet

OTHER PUBLICATIONS

Li X et al, "Coastline change detection with satellite remote sensing for environmental management of the Pearl River Estuary, China", Journal of Marine Systems, Elsevier, vol. 82, Aug. 1, 2010, pp. S54-S61.

Zora Konjovic et al, "Land Use Management Based on GPS Technology, and Satellite and Ground Remote Sensing Technologies", Telecommunications in Modern Satellite, Cable and Broadcasting Service S, 2007. Telsiks 2007. 8th International Conference on, IEEE, PI, Sep. 1, 2007, pp. 369-384.

Onywere S M et al, "Application of satellite remote sensing techniques in land use and land cover pattern analysis of the Nakuru-Nyahururu area", International Geoscience and Remote Sensing Symposium, 1993. Igarrs' 93. Better Understanding of Earth Environment. Tokyo, Japan Aug. 18-21, 1993, New York, NY, USA, IEEE, Aug. 18, 1993, p. 927.

European Search Report dated Oct. 19, 2011 for European Application No. EP11382136.

Punter et al. "Well-to-Wheel Evaluation for Production of Ethanol from Wheat", Oct. 2004, pp. 1-40.

"Life Cycle Assessments Applied to First Generation Biofuels Used in France", Final Report, 2010, pp. 1-229.

Well-to-Wheels analysis of future automotive fuels and powertrains in the European context, Well-To-Tank Report, Version 2c, Mar. 2007, pp. 140.

"Description of individual processes and detailed input data", Well-to-Wheels analysis of future automotive fuels and powertrains in the European context, Well-To-Tank Report, Version 2c, Mar. 2007, pp. 1-80.

"Análisis Del Ciclo De Vida De Combustibles Alternativos Para El Transporte.", Energía y cambio climático, 2005, pp. 1-112.

Birkman et al., "Well-to-Wheels Analysis of Advanced Fuel/Vehicle Systems—A North American Study of Energy Use, Greenhouse Gas Emissions, and Criteria Pollutant Emissions", 2005.

Manonmani et al., "Remote Sensing and GIS Application in Change Detection Study in Urban Zone Using Multi Temporal Satellite", Intl Jour of Geomatics and Geosciences, 2010, vol. 1, pp. 60-65.

Nemecek et al., "Life Cycle Inventories of Agricultural Production Systems", ecoinvent report No. 15, 2007, pp. 1-4.

Nemecek et al., "Life Cycle Inventories of Swiss and European Agricultural Production Systems", ecoinvent report No. 15a, 2007, pp. 1-308.

Kagi et al., "Life Cycle Inventories of U.S Agricultural Production Systems", ecoinvent report No. 15b, 2007, pp. 1-46.

Jungbluth et al., "Life Cycle Inventories of Bioenergy", ecoinvent report No. 17, 2007, pp. 1-755.

Spielmann et al., "Transport Services", ecoinvent report No. 14, 2007, pp. 1-237.

Wang, "Research on "Beijing 1" Micro-Satellite Image Quality and Land Use Classification Precision", The International Archives of the Photogrammetry, Remote Sensing and Spatial Information Sciences, 2008, vol. 37, pp. 941-944.

De Klein et al., "Chapter 11 N2O Emissions From Managed Soils, and CO2 Emissions From Lime and Urea Application", IPCC Guidelines for National Greenhouse Gas Inventories, 2006, 11.1-11.54.

Triantaphyllou et al., "Multi-Criteria Decision Making: An Operations Research Approach", Encyclopedia of Electrical and Electronics Engineering, 1998, vol. 15, pp. 175-186, John Wiley & Sons.

Horion et al., "Spatial Aggregation of Low Resolution Satellite Data for the Monitoring of Vegetation Response to Climatic Stresses: Analysis of the Spatial Heterogeneity of Aggregated Entities", Proc. 'Envisat Symposium, 2007.

Wu et al., "Fuel-Cycle Assessment of Selected Bioethanol Production Pathways in the United States", Argonne National Laboratory, 2006, pp. 1-52.

Chuvieco et al, 2008. Global burned-Land estimation in Latin America using Modis Composite Data. Ecological Applications, 18 (1), 2008, pp. 64-79 (p. 65, paragraph 6).

* cited by examiner

SYSTEM FOR IDENTIFYING SUSTAINABLE GEOGRAPHICAL AREAS BY REMOTE SENSING TECHNIQUES AND METHOD THEREOF

CROSS REFERENCE TO RELATED APPLICATION

This application claims priority upon European Application No. EP11382136.7, filed May 9, 2011. This application is hereby incorporated by reference in its entirety for all of its teachings.

OBJECT OF THE INVENTION

The present invention relates to the field of recognition and presentation of data and images, and more specifically to arrangements and methods for identifying regions with sustainable characteristics using remote sensing techniques.

The main object of the invention is a system and a method for identifying sustainable geographical areas for the production of raw materials intended for bioproduct production by remote sensing techniques.

BACKGROUND OF THE INVENTION

At present, it is well known that the global climate is being altered significantly as a result of increased concentrations of greenhouse gases such as carbon dioxide, methane, nitrous oxides and chlorofluorocarbons. These gases are trapping an increasing proportion of terrestrial infrared radiation and are expected to increase global temperatures (so-called Greenhouse Effect and Global Warming). That is why the enormous importance that are currently taking all initiatives for the use of bioproducts, and more particularly biofuels. It should be noted that the term "bioproducts" include building materials, pulp and paper, forest products, biofuels, bioenergy, starch-based and cellulose-based ethanol, biochemicals, bioplastics, etc.

Bioproducts are active subjects of research and development, and these efforts have developed significantly since the turn of the 20/21st century, mainly driven by the environmental impact of petroleum use. Bioproducts derived from bioresources can replace much of the fuels, chemicals, plastics etc. that are currently derived from petroleum. For example bioenergy is sort of bioproduct which provides a renewable energy source made available from materials derived from biological sources.

Said bioproduct used as a real alternative must be sustainable. To obtain sustainable bioproduct, it must ensure that the origin of raw materials is sustainable, but the checking in-situ is very difficult.

Likewise it is important to define remote sensing as a "technique which provides remote information from the objects in the Earth's surface or phenomena that take place thereof. For this remote observation there must be some kind of interaction between the objects and the sensor". (Chuvieco, "Fundamentals of satellite remote sensing", 1996). Currently it is well known the use of satellite images for displaying different phenomena produced, for example: population growth, urban planning, rural planning, etc.

The following describes an example of sustainability requirements that could be requested to the raw material (biodiversity requirement, carbon stock requirement, and peatland requirement):

1—Biodiversity Requirement:

1a) Primary forest and other (primary) wooded land, namely forest and other wooded land of native species, where there is no clearly visible indication of human activity and the ecological processes are not significantly disturbed.

1b) Nature Protection Areas:
Areas designated by law or by the relevant competent authorities for nature protection purposes; or,
For the protection of rare, threatened or endangered ecosystems or species recognized by international agreements, or included in lists drawn up by intergovernmental organizations or the International Union for Conservation of Nature (IUCN).

1c) Highly Biodiverse Grassland:
Natural: namely grassland that would remain grassland in the absence of human intervention and which maintains the natural species composition and ecological characteristics and processes; or
Non natural: namely grassland that would cease to be grassland in the absence of human intervention and which is species-rich and not degraded.

Exceptions:
Nature protection areas: evidence is provided that raw material production does not interfere with nature protection purposes.

2—Carbon Stock Requirement:

2a) Wetlands: namely land that is covered with or saturated by water permanently or for a significant part of the year.

2b) Continuously forested areas namely land spanning more than one hectare with trees higher than five meters and canopy cover of more than 30% or trees able to reach those thresholds in situ. It does not include land that is predominantly under agricultural or urban land use.

2c) Lands spanning more than one hectare with trees higher than five meters and a canopy cover between a given range, or trees able to reach those thresholds in situ, unless evidence is provided.

Exceptions:
The provisions of this paragraph shall not apply if, at the time when the raw material was obtained, the land had the same status it had in a specific earlier date.

3—Peatland Requirement:
Raw material intended for bioproduct production shall not be made from land that was peatland in a specific earlier date.

Exceptions:
Evidence is provided that the production and harvesting of that raw material does not involve drainage of previously undrained soil.
Evidence is provided that the soil was completely drained in a particular year.
Evidence is provided that there has been no draining of the soil since a particular earlier date.

4—Land Use Change Requirement (LUC Requirement):
It refers to the need of minimizing emissions of greenhouse gases caused by changes in land use since a particular year. Land use change should be understood as referring to changes in terms of land cover between the six land categories used by the IPCC (forest land, grassland, cropland, wetland, settlements and other land) plus a seventh category of perennial crop.

Exceptions:
A change from one crop to another is not considered land use change.
Cropland includes fallow land (land left at rest for one or several years before being cultivated again).
A change of management activities, tillage practice or manure input practice is not considered land use change The technical problem posed here is to provide a system and a method for the detection, recognition and location of those potential areas or regions that could be used for the production of raw materials intended for bioproduct production, ensuring that the origin of raw materials is sustainable and avoiding travel to the area of interest, thus saving time and economic costs, and preventing errors and fraud.

DESCRIPTION OF THE INVENTION

The present invention resolves the aforementioned drawbacks by providing a system and a method for identifying sustainable geographical areas for the production of raw materials intended for bioproduct production by remote sensing techniques. More specifically, this method is particularly applicable for identifying those areas that comply with previously defined sustainability requirements. Said sustainability requirements state that raw material intended for bioproduct shall not be made from lands with a high biodiversity, high carbon stock or peatlands, and bearing in mind additionally the land use requirement cited above.

Next, some definitions corresponding to some terms which will be used below are provided:
- Go area: is a region that complies with established sustainability requirements for biodiversity, carbon stock and peatland.
- Partial Go area: is a region that complies with the established sustainability requirements for biodiversity (except for nature protection areas), carbon stock and peatland.
- Origin: is the geographical denomination that stands for the production and harvesting zone of the raw material to be further processed into bioproduct.
- Sustainable origin: is the origin of the raw material which is deemed to comply with the established sustainability requirements for biodiversity, carbon stock, peatland and land use change.

The system for identifying sustainable geographical areas object of the present invention comprises:
- at least one imaging system adapted to capture images of the geographical areas wherein said at least one imaging system is furnished with image transmission means for transmitting the captured images,
- at least one data base accessible by the imaging system adapted to allocate at least images,
- at least one historical database comprising historical images of the geographical areas and accessible by the processing unit,
- at least one processing unit at least connected to the databases and adapted to retrieve and process the images captured by the imaging system by means of an image processing module and the historical images, and
- storage means accessible by the processing unit.

Preferably said system for identifying sustainable geographical areas further comprising output means linked to the processing unit and adapted to display information related to the geographical areas. Said imaging system preferably comprises at least one sensor selected from the group consisting of: low resolution sensors, medium resolution sensors and high resolution sensors.

Likewise, preferably, at least one database further comprises historical images of geographical areas.

At least one database comprises auxiliary data comprising:
- cartographic data comprising supporting data for the process of orthorectification of images,
- thematic data comprising supporting data for the land use analysis, and
- biodiversity data comprising supporting data for the identification of nature protection areas.

On the other hand at least one database is allocated at a server or at the storage means, accessible by the processing unit.

According to another object of the invention, the method for identifying sustainable geographical areas, object of this invention, basically stands out for comprising the following steps:
a) information capture, which comprises the following steps:
   a1) satellite images capture for the studied region, in low or medium/high resolution, from the at least one imaging system and the database of historical archives of images available in official data bases,
   a2) auxiliary data selection used to facilitate analysis of land use cover, or as baseline layer of the studied region, for example, to evaluate biodiversity referring to protected areas,
b) land use analysis, which comprises the following steps:
   b1) satellite images import into the image processing module,
   b2) images preprocessing in low or medium/high resolution for images conditioning, in order to obtain a land use classification distinguishing the figures defined by sustainability requirements in one map, and the six categories used by IPCC plus a seventh category of perennial crops in another map,
   b3) image classification in order to obtain the land use classification, identifying the land cover for each area,
c) information processing, which comprises the following steps:
   c1) information processing for identifying land uses,
   c2) information processing for identified protected figures,
   c3) comparing the processed information in order to determine land use matching and non matching areas,
d) analysis process by documentary evidence, and
e) displaying the results.

This method provides information that allows demonstrating fulfillment of the land use requirements (high biodiversity, high carbon stock and peatland) in the studied areas and the land use change in accordance with the six categories used by IPCC plus a seventh category (perennial crop) in the studied areas.

The aim of this method is to identify:
- Areas that comply with sustainability requirements, hereinafter "Go Areas".
- Regions without land use change.

The method object of the invention complies with the following conditions:
- Uniformity and homogeneity: the process must be easily applied in any other region and any other temporal range, obtaining comparable results. In order to be able to implement the method in new regions or temporal periods if necessary.
- Use of methodological standards proven and characterized by effectiveness in the process.

Additionally, the present method provides maps using graphic evidence, complementing part of the information with documentary evidence where required. The process comprises one main stage:
- Map development process where the data (satellite images, or complementary maps among others) are initially captured, and the data are then analyzed, obtaining maps with land use information compiled according to land use criteria. Two differentiated information processing procedures are carried out on the analyzed data: on the one hand processing for land use figures and, on the other hand, a specific processing for protected figures.

The information processing is compared, preferably polygon by polygon, or pixel by pixel, among others, for each area in two reference dates (the initial reference year and the final reference year). The following is obtained as results from this process:

One Go area map, and

Map to identify land use change.

In the Go areas map, all studied regions accomplish with the sustainability requirements for biodiversity, peatland and carbon stock. In parallel, the land use change map, all studied regions must be compiled in a map where the changes of categories are identified by region.

Those coincident regions to NUT 3 or lower level (or their correspondence in GAUL or other administrative unit), which comply with sustainability requirements and do not have land use change are included in the sustainable origins list. It should be noted that "NUT" and "GAUL" are territorial systems of geographical division.

Some preferred aspects relating the steps a) to e) are explained in higher detail below:

a) Information capture, review and verification of data:

This step is undertaken in order to:
- compile all necessary information from available data sources to execute the project in each studied region.
- select only the suitable sources to cover project requirements.
- acquire or download the selected data
- undertake quality controls.

a1) According to a preferred embodiment of the invention, the satellite images captured are obtained (for instance, purchased) from available sources.

Satellite images are selected to obtain a whole cover of each studied area and to represent the land use types on reference dates, initial and final date (map generation date). The selected images must be chosen considering that the combination of spatial, spectral and radiometric resolution is the best suitable in order to demonstrate sustainability requirements and quality requirements.

The satellite images are differentiated in accordance with resolution and temporal availability:

Low resolution images must be downloaded for the initial reference date and the final reference date (comparative date), in order to guarantee the maximum temporal cover.

Medium/high resolution images must be downloaded for two representative dates, the initial reference date and the final reference date (comparative date).

The image selection between low and medium/high resolution is taken in order to cover the sustainability requirements with the best quality as possible. Multi-temporal analyses of image makes it possible to represent the seasonal variation in land use cover in the best possible way, mainly reducing cloudy, foggy, shadow or cover impact. Finally, the image must be downloaded and subjected to quality validation, fulfilling the data quality. Data validation records should be kept. The results of the analysis process must be shown in a report and downloaded images must be stored in a database.

a2) A selection of auxiliary data and images is required to make an extensive compilation of information. Preferably, the auxiliary data is selected from geographic databases belonging to official sources such as official organizations or authorized governmental agencies on the relevant matter, said auxiliary data comprising:
- cartographic data comprising supporting data for the process of orthorectification of images,
- thematic data comprising supporting data for the land use analysis, and
- biodiversity data comprising supporting data for the identification of nature protection areas.

This auxiliary data is used as support to facilitate analysis of land use cover, or as baseline layer. For example, to evaluate biodiversity referring to protected areas.

In the case of protected areas, the auxiliary information compiled for biodiversity is used directly from official databases, except for the necessary processing in order for it to be compatible with the resulting information processing map for land use figures. As the final result of the auxiliary data selection for nature protection areas, a map is obtained with the protected figures.

b) Land use analysis:

In this stage the images are analyzed and classified through a standardized process, explained as follows. The same process must be performed for the initial reference year and the comparative final reference year.

b1) Satellite images captured are imported into a digital image processing software. There are two types of resolution:

Low resolution data, and

Medium/high resolution data.

b2) Images are preprocessed in low or medium/high resolution for images conditioning:

Low resolution data load, mosaic and reprojection. In order to cover the total surface of the studied region, a mosaic of scenes must be produced with all images downloaded for each date. Firstly the downloaded image in original format must be imported to the digital image processing software. In this way the geometric references would not be lost and integration with other data sources is possible. In the mosaic process, the low resolution images are projected in the coordinates of a common reference geographic system.

Medium/high resolution data load and orthorectification. In this case, the medium/high resolution images is imported to the digital image processing software, and it is orthorectified with necessary auxiliary data that makes it possible to guarantee appropriate accuracy in the results. Preferably the orthorectification process comprises the following steps:

tie points measurement, calculation and application of a mathematical geometric model, and calculation of the geometric error.

b3) Image Classification:

The final result is to obtain the following for both years (initial and final):

A land use classification distinguishing the figures defined by sustainability requirements in one map and, The six categories used by IPCC plus a seventh category of perennial crops in another map.

The image classification is performed in order to obtain the land use classification, identifying the land cover for each area. Preferably, this step b3 further comprises classifying images in order to obtain land uses of forested areas with canopy cover between 10 and 30%.

A standard classification is used for the image classification considering the differentiated covers. Image classification is the process that identifies the different spectral classes of each image and it is associated in generic categories. On this resultant product it is necessary to analyze the cover type. Likewise, auxiliary data is used for the image classification such as baseline, which makes it possible to identify large covers such as water masses or urban areas, among others.

Aggregation and Exportation:

Once the image classification process has been finished, an analysis of the cover type and the seasonality is made in order to aggregate, depending on the categories required, the figures defined by sustainability requirements on the one hand and on the other hand the categories used by IPCC, plus a seventh category of perennial crop.

The aggregation in accordance with categories defined by sustainability requirements is repeated for the initial reference year and the final reference year. A comparative analysis is to be made in both aggregations of land use. The comparative analysis between the two reference years for the aggregation is made in the same way depending on the six categories used by IPCC plus a seventh category of perennial crop. The results could be exported in the most convenient image format in order to upload them in Geographic Information Systems (GIS) software.

c) Information Processing:

c1) Information Processing for Identifying Land Uses (Comparative).

The results obtained are preferably shown in two maps representing the land use classification of figures, and two maps depicting the land use classification of the six categories used by IPCC plus a seventh category of perennial crop, corresponding to the initial reference year and the final reference year. The comparative analysis on land use evolution in the selected region can preferably be made using these maps. The analysis of land use evolution may preferably be determined by processing a cover percentage for each selected polygon/pixel of each land use category. The analysis will be made for all the polygons/pixels determined in the entire studied areas. This process will allow determining if a change of category has been produced for each area.

The result of the comparative analysis for land use change maps is preferably a map establishing the regions with category change or without category change. In parallel, the result of the comparative analysis for sustainability requirements study is a partial result, identifying the partial Go areas. This result of comparative analysis can be positive or negative.

Positive result: this result could be obtained in two cases when,

All land use categories of the entire studied area are maintained from the initial reference date to the final reference date; in consequence, a change of typology has not occurred, or A change of typology has occurred but the cover of land use categories required by sustainability requirements has increased (assessing each land use category polygon by polygon) or cropland has decreased (assessing cropland category polygon by polygon) from the initial reference date to the reference final date.

In both cases of positive result the requirements comply with sustainability requirements. In consequence partial Go area will be obtained.

Negative result: this result could be obtained when a change of category has occurred; the cover of land use figures required by sustainability requirements decreased or cropland increased from the initial reference date to final reference date. The result of this comparative will be no-Go area. If the comparison has a negative result, an analysis process of documentary evidence must be opened. If this analysis has a negative result it will be considered no-Go area definitively and if the analysis result is a positive result supported with reliable documentary evidence, the comparative result will be considered a partial Go area.

c2) Information Processing for Protected Figures (Biodiversity)

The information selected for protected figures in the information capture process must be matched up in order to complete the analysis of protected figures on the results obtained in the information processing for land use figures. The protected figure information must represent the areas designated by law, authorities for nature protection purposes, intergovernmental organizations, IUCN or international agreements.

c3) Comparing the Processed Information in Order to Determine Land Use Matching and Non Matching Areas.

Preferably this step c3 is carried out identifying those lands classified according to sustainability requirements above mentioned. Once nature protection areas are matched up, the result of analysis may match or not with land use figures into partial Go area:

If a protected figure matches with land use figures into partial Go area: the region complies with sustainability requirements, in consequence the region is a Go area.

If a protected figure does not match (totally or partially) with land use figure into partial Go area: an analysis process for documentary evidence must be opened. If the result of this analysis is that the area is not compatible with the production of raw materials, the area will be considered a non-sustainable origin. In contrast, if the analysis result is that the area is compatible with the production of raw materials, the area will be considered a Go area.

Those regions classified as Go areas and without land use change in the LUC map will be included in the sustainable origin list, and no further evidence is needed for the production of raw materials in the origin than to demonstrate proper origin and consistency of quantities produced through Mass Balance System requirements.

This final information shall include suitable codes for geographical demarcation, in order to facilitate its further use throughout the implementation of the scheme, the verification process and also the maps themselves.

d) Documentary Evidence:

In those cases where graphic evidence is not enough to demonstrate fulfillment of sustainability requirements, an analysis of documentary evidence will be made, which consists of the compilation of complementary information that makes it possible to demonstrate the fulfillment of sustainability requirements through an exhaustive study of a specific area (NUT 3 or lower level or in its correspondence in GAUL or other administrative unit) considering:

Official statement from an official organization or authorized governmental agency on the relevant matter, on some or all the sustainability criteria.

Official databases that compile information on specific figures required by sustainability requirements or that can demonstrate that the surface cover by land use figures required by sustainability requirements have maintained a positive trend in the studied region from the initial reference year to the year of study. In the event that data are not available for the initial reference year, historic data will be used to calculate a trend line. Only in the case that each sustainability criteria required by sustainability requirements can be positively demonstrated with at least one or several reliable pieces of evidence from the above list would the studied region be considered a sustainable origin. Records of each piece of documentary evidence must be maintained, complying with updating requirement.

e) Displaying the Results:

Preferably, the results are displayed through a sustainable origin list or a map representing suitable origins for the production of raw materials intended for bioproduct production.

DESCRIPTION OF THE DRAWINGS

In order to complement this description and with the object of helping to better understand the characteristics of the invention, a set of drawings, in accordance with a preferred example of practical embodiment thereof, has been included as an integral part of said description, wherein the following has been represented in an illustrative and non-limiting manner:

FIG. 1.—Shows the result of sustainable areas obtained according to a preferred embodiment of the invention.

PREFERRED EMBODIMENT OF THE INVENTION

The following describes a preferred embodiment in which the satellite images capture is carried out by IRS-P6 satellite over the study region of Salamanca (Spain), as shown in FIG. 1.

Said IRS-P6 incorporates LISS-III sensor adapted to capture images of 20 m spatial resolution in 4 spectrum bands (red, green, NIR, SWIR), and AWIFS sensor, whose images comprise a spatial resolution of 60 m in the same bands that the LISS-III sensor. The medium resolution images captured and selected in the present embodiment are:

| Satellite | Sensor | Pixel | Acquisition | GAUL2 |
|---|---|---|---|---|
| IRS-P6 | AWIFS | 60 m | Summer | Salamanca |
| IRS-P6 | AWIFS | 60 m | Summer | Salamanca |
| IRS-P6 | AWIFS | 60 m | Autumn | Salamanca |
| IRS-P6 | AWIFS | 60 m | Winter | Salamanca |
| IRS-P6 | AWIFS | 60 m | Summer | Salamanca |
| IRS-P6 | LISS_III | 20 m | Spring | Salamanca |
| IRS-P6 | LISS_III | 20 m | Spring | Salamanca |
| IRS-P6 | LISS_III | 20 m | Autumn | Salamanca |
| IRS-P6 | LISS_III | 20 m | Autumn | Salamanca |

Additionally, the auxiliary data selected in order to facilitate analysis of land use cover, is:

a) Cartographic Auxiliary Data:
   Digital Elevation Model (DEM)
   Basic cartographic information from Spain.

The orthorectification of the medium-resolution images is carried out with the support of basic cartographic information from Spain and Digital Elevation Model, in order to eliminate the geometric distortions due mainly to relief, the curvature of the earth's surface and the geometry of image acquisition. For the present embodiment it is selected DEM from ASTER satellite which is free access.

Basic cartographic information from Spain, provided by National Center for geographic information, includes limits of the regions, provinces and towns from the digital cartographic base BCN50.

b) Thematic Auxiliary Data:
   CORINE Land Cover 2006
   Statistics uses and land cover
   Landsat 7 ETM Base It is selected CORINE Land Cover 2006 (Coordination of Information on the Environment). It is a land uses map at European level. This map represents the territory according to 44 classes of land use, grouped into 5 levels. Level 3 is the highest level of detail that reaches the CORINE classification for the entire European c) Biodiversity Data:
   Protected areas and areas recognized by the International Union for Conservation of Nature (IUCN)
   Natura network 2000
   Primary Forests.

The fulfillment of the sustainability requirements should be demonstrated with external proof, such as graphic evidence through technological solutions and documentary evidence. The reference dates of the evidence used by the present embodiment are detailed in the next table:

| Requirement | Restrictions | Initial date | Final date |
|---|---|---|---|
| Biodiversity | Primary forest and other (primary) wooded land Nature protections areas High biodiverse grassland | 2008 | 2009 |
| Carbon stock | Wetland Forested areas | 2008 | 2009 |
| Peatland | Peatland | 2008 | 2009 |
| Land use change | Change between land use categories | 2008 | 2009 |

The evidence admitted for this embodiment has the following formats:
   Graphic evidence.
   Documentary evidence such as Official statements, legislation or official databases.

Finally, after application of the present method for identifying sustainable areas, it is considered that Salamanca is a sustainable origin for the production of raw materials intended for bioproduct production.

The invention claimed is:

1. Method for identifying sustainable geographical areas by remote sensing techniques, the method comprising:
   collecting at least one initial reference date image and one final reference date image of the geographical area,
   storing said at least one initial date and final date reference images in at least one database,
   collecting auxiliary data from geographical databases said auxiliary data being related to the geographical areas and comprising:
   cartographic data of the geographical areas,
      thematic data of the geographical areas related to the use of the geographical areas,
      biodiversity data of the geographical areas comprising supporting data related to nature protection areas,
   importing the images and the auxiliary data into an image processing module,
   processing the images by at least comparing pixel by pixel the initial date and the final date reference images by means of the image processing module identifying canopy covers,
   generating at least one first map of the geographical areas said map comprising land use classification according to figures defined by sustainaility requirements,
   generating at least one second map of the geographical areas said map comprising data related to six categories of IPPC, and a category related to perennial crops, and
   generating, by combining the first and second maps, a result map comprising information regarding category changes from the initial and final reference dates in the geographical areas.

2. The method of claim 1 wherein at least one of the reference images is collected from a database of historical archives of images available in official databases.

3. The method of claim 1 wherein at least one of the reference images is collected by means of an imaging system.

4. The method of claim 1 wherein the images are selected from the group consisting of: low, medium and high resolution images.

5. The method of claim 4 wherein the low resolution image processing comprises generating a mosaic of low resolution images wherein said mosaic of images comprises coordinates of a common reference system for each low resolution image.

6. The method of claim 1 wherein the image processing comprises an orthorectification of the reference images using the cartographic data as reference data.

7. The method of claim 1 further comprising determining canopy cover levels of 10-30% from the images by means of the image processing module, identifying the different spectral classes of each image.

\* \* \* \* \*